Feb. 25, 1941.   B. ATKINS   2,232,760
FULL CIRCLE TREAD VULCANIZER
Filed March 9, 1939   2 Sheets-Sheet 1

INVENTOR.
Berl Atkins,
BY
ATTORNEY.

Feb. 25, 1941.     B. ATKINS     2,232,760
FULL CIRCLE TREAD VULCANIZER
Filed March 9, 1939     2 Sheets-Sheet 2

INVENTOR.
Berl Atkins,
BY
ATTORNEY.

Patented Feb. 25, 1941

2,232,760

UNITED STATES PATENT OFFICE 2,232,760

FULL CIRCLE TREAD VULCANIZER

Berl Atkins, East Orange. N. J.

Application March 9, 1939, Serial No. 260,681

4 Claims. (Cl. 18—18)

The invention herein disclosed relates to vulcanizers for recapping tires.

Special objects of the invention are to provide a particularly simple and inexpensive, easily handled form of recapping vulcanizer of strong sturdy construction and of such a design as to enable any desired thickness of rubber to be applied to the tire and in the shortest possible period of time.

The foregoing and other desirable objects are attained in this invention by the novel features of construction, combinations and relations of parts hereinafter described, illustrated in the accompanying drawings and broadly covered in the claims.

The drawings show one practical commercial embodiment of the invention, but structure may be modified and changed, all within the true intent of the invention as will be apparent from the broad scope of the claims.

Figure 1:
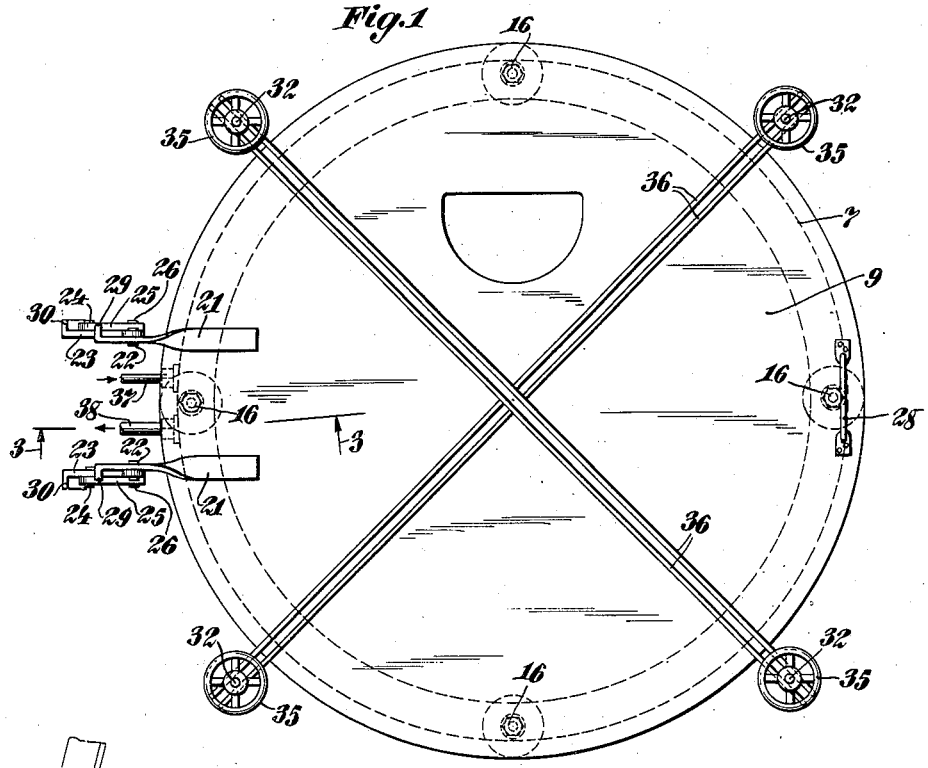
Fig. 1 is a top plan view of one of the vulcanizers.
Figure 2:
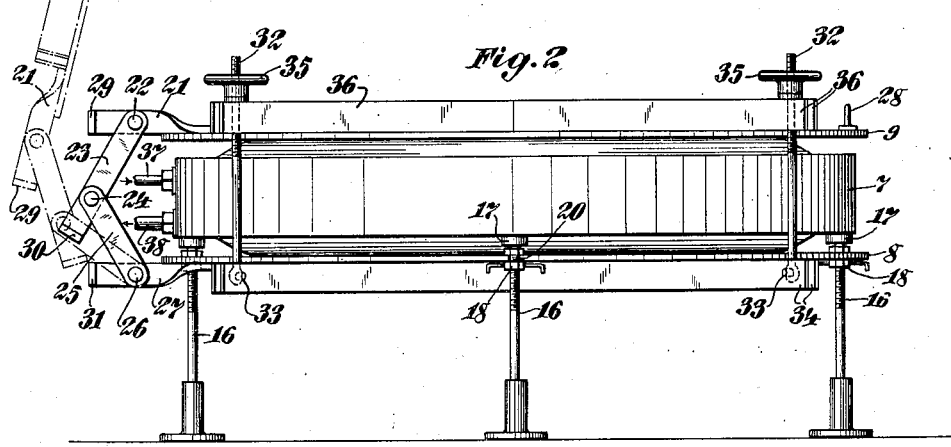
Fig. 2 is a side elevation, with dotted lines indicating the action of the self-adjusting free swinging hinge of the cover.

As shown in Figs. 1 and 2, the machine consists of only three main parts, a vulcanizing ring 7, an adjustable tire supporting plate 8, below the same and an adjustable top cover 9.

Figure 3:
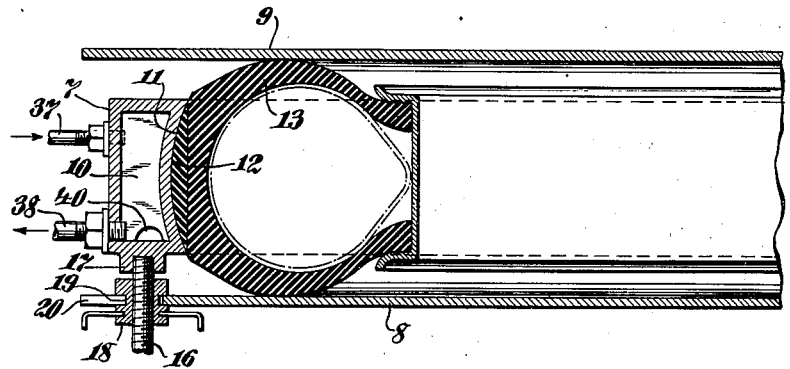
Fig. 3 is an enlarged broken sectional view as on substantially the plane of line 3—3 of Fig. 1.
Figure 4:
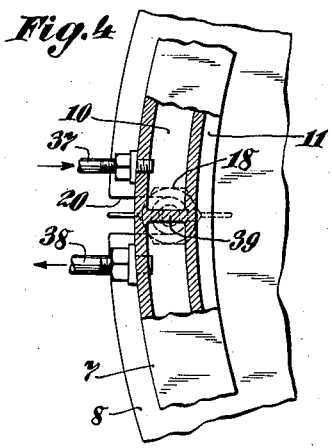
Fig. 4 is a partial plan and broken sectional detail of the vulcanizing ring and lower tire supporting plate.

The vulcanizing ring, as shown in detail in Figs. 3 and 4, may be in the form of a single rigid hollow casting providing a steam chamber 10, smoothly finished at its inner annular surface 11, to vulcanize the capping material 12, to the desired crown conformation of the tire. In the illustration, the vulcanizing wall 11, is shown as contoured on a smooth rounded concavity in accordance with the desired smooth rounded crown of the tire.

Figure 5:
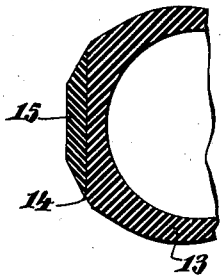
Fig. 5 is a broken sectional detail of a tire with camelback strip applied, ready for vulcanizing in the machine.

Fig. 5 shows the tire 13, buffed on the line 14, and having the camelback 15, applied thereto, ready to go into the vulcanizer.

The vulcanizing ring is supported in the present disclosure in substantially horizontal or slightly inclined to the horizontal position on legs or supporting posts 16, shown as adjustably screwed up into bosses 17, on the underside of the ring.

The bottom, tire supporting plate is shown as adjustably supported on these same posts by means of wing nuts 18, grooved at 19, to enter corresponding slots 20, in the periphery of the supporting plate. By turning these adjustable abutment nuts, the bottom plate may be raised or lowered in respect to the vulcanizing ring, thus to center and support tires of different diameter with the tread portions of the same in proper alignment with the vulcanizing ring.

The cover or top plate 9 is shown as loosely hinged to the bottom plate by means of spaced outwardly projecting hinge lugs 21, pivoted at 22, to the upper ends of hinge links 23, which in turn are pivoted at 24, to the upper ends of hinge links 25, pivoted at their lower ends at 26, to outwardly projecting lugs 27, of the bottom plate. Opposite this loose hinge connection, the top plate is shown as having a handle 28, by which it may be raised to an open position, such as indicated in the broken lines in Fig. 2. In so raising the cover, stop lugs 29, on the extended ends of the hinge lugs 21, engage the back of the upper links 23, and lugs 30, on the extended lower ends of the latter engage the back of the lower links 25, which in final position come to rest against stop shoulders 31, on the rearward extended ends of the lower hinge lugs 27. This construction causes the loose hinge to stiffen up or become the equivalent of a rigid jointed hinge, step-by-step, in three steps as the cover is raised to the full open position indicated in the broken lines. Conversely, this hinge permits the cover to be lowered in self-adjusting steps and to adapt itself automatically to the particular diameter of tire in the vulcanizer.

For applying a confining pressure to the tire during the vulcanizing operation, swing bolts 32, are shown pivoted at 33, between the spaced projecting ends of the bars 34, on the lower plate and carrying hand clamp nuts 35, for engaging over the spaced projecting ends of the bars 36, on the top plate.

Four swing bolt fastenings are shown in the illustration disposed in quadrangular relation. These, with the crossed diametrically extending pairs of bars 6, form a strong and sufficiently rigid clamp structure, of relatively light weight and which can be quickly and easily manipulated.

The annular steam chamber of the vulcanizing ring is shown as having a steam inlet connection 37, and outlet 38, at opposite sides of a cross partition 39, Fig. 4, and the latter is shown in Fig. 3, as having an opening 40, at the bottom enabling condensation from either side of the partition to flow out through the exhaust connection 38, which preferably is located at the bottom of the chamber.

Usually the machine will be set up with the vulcanizing ring on a slight angle to the horizontal, inclined downward toward the drain 38, so that the ring will automatically clear itself of any condensed liquid. This adjustment of inclination can be effected by adjusting the supporting post 16, or by simply blocking up the two posts at the front of the machine.

Braced as it is by the cross bars 36, the top plate 9, may be light enough to be raised and lowered simply by the handle 28. If desired however, a suitable hoist or equivalent may be used for such purposes, in which event, the handle provides a convenient hold for attachment of the hoist chain or other connection.

With this simple construction, the heat is applied directly by the vulcanizing ring and to only the recapped portion of the tire. This requires a minimum of heat and time and avoids any weakening of the side walls, thus enabling a tire to be recapped any number of times. Any thickness of rubber from a very thin layer, up to an extra heavy layer can be applied. After putting on a smooth cap with this smooth faced vulcanizing ring, the new tread surface may be grooved as desired, to match the side walls and conform generally to the original design of the tire. The tubular vulcanizing ring forms a relatively rigid element and so may provide the main strength required in the machine, forming in effect a substantial frame to which the supporting posts are attached. The top and bottom plates may then be of relatively light and inexpensive sheet material. It will be clear from the foregoing that the invention provides a full circle tread vulcanizer, which can be used for recapping or other related purposes. Thus tires which have been cut or damaged in different places on the tread may be repaired with tread stock and cured all in one operation and without damaging the tread design.

What is claimed is:

1. A tire recapping vulcanizer, comprising a vulcanizing ring, screw threaded posts adjustably engaged with said vulcanizing ring for supporting the same in substantially horizontal and inclined to the horizontal position, a tire supporting plate, screw abutments on said posts engaging said tire supporting plate for adjustably supporting said tire supporting plate in different tire supporting positions below said vulcanizing ring, a cover plate and means for adjustably securing the latter over a tire resting on the supporting plate within said vulcanizing ring, said securing means including readily releasable adjustable fastenings between the bottom plate and cover plate about the rim of the vulcanized ring.

2. A tire recapping vulcanizer, comprising a rigid steam jacketed vulcanizing ring, posts engaged with said ring for supporting the same in substantially horizontal and inclined to the horizontal position, a tire supporting plate beneath said ring and having portions engaged about said posts, abutments adjustable on said posts and engaging those portions of the supporting plate which are engaged about said posts for thereby supporting said plate in adjustable relation to said vulcanizing ring, a cover having a free hinging connection with said supporting plate and means for adjustably securing said cover to said supporting plate.

3. A tire recapping vulcanizer, comprising a rigid steam jacketed vulcanizing ring, posts engaged with said ring for supporting the same in substantially horizontal and inclined to the horizontal position, a tire supporting plate beneath said ring and having portions engaged about said posts, abutments adjustable on said posts and engaging those portions of the supporting plate which are engaged about said posts for thereby supporting said plate in adjusting relation to said vulcanizing ring, a cover having a free hinging connection with said supporting plate, means for adjustably securing said cover to said supporting plate, said means including swing bolts and adjustable clamp nuts thereon, said supporting plate and cover having bars with spaced projecting end portions receiving said swing bolts.

4. A tire recapping vulcanizer, comprising a rigid steam jacketed vulcanizing ring, posts engaged with said ring for supporting the same in substantially horizontal and inclined to the horizontal position, a tire supporting plate beneath said ring and having portions engaged about said posts, abutments adjustable on said posts and engaging those portions of the supporting plate which are engaged about said posts for thereby supporting said plate in adjustable relation to said vulcanizing ring, a cover having a free hinging connection with said supporting plate, means for adjustably securing said cover to said supporting plate, the steam jacket of said vulcanizing ring having a partition and steam inlet and outlet connections at opposite sides of said partition.

BERL ATKINS.